United States Patent [19]

Roland

[11] 4,075,195
[45] Feb. 21, 1978

[54] DEBITTERED PROTEIN PRODUCT AND METHOD FOR MANUFACTURE

[75] Inventor: John F. Roland, Glenview, Ill.

[73] Assignee: Kraft, Inc., Glenview, Ill.

[21] Appl. No.: 719,347

[22] Filed: Aug. 31, 1976

[51] Int. Cl.$^2$ ............................ A23J 1/14; A23J 1/20
[52] U.S. Cl. ................................ 260/119; 260/112 R; 260/123.5
[58] Field of Search ................. 260/112 R, 119, 123.5

[56] References Cited

U.S. PATENT DOCUMENTS

| | | | |
|---|---|---|---|
| 2,879,264 | 3/1959 | Xander et al. | 260/112 R |
| 3,391,001 | 7/1968 | Sair | 260/112 R X |
| 3,493,385 | 2/1970 | Hack | 260/112 R X |
| 3,929,890 | 12/1975 | Pfister | 260/112 R X |

OTHER PUBLICATIONS

Suzuki, *Chemical Abstracts*, vol. 83:162,409f, (1975).

Yamashita et al, *Chemical Abstracts*, vol. 74:11,982a, (1971).

*Primary Examiner*—Walter C. Danison
*Attorney, Agent, or Firm*—Fitch, Even, Tabin & Luedeka

[57] ABSTRACT

The present invention is directed to a method for debittering protein hydrolysates and to a debittered protein hydrolysate product. In the method, an aqueous solution of a protein hydrolysate is provided. The solution is passed through a bed of phenolic resin particles. A first portion of the solution is collected as it exits from the bed. The first portion contains a non-bitter fraction of the protein hydrolysate. After collection of the first portion of non-bitter protein hydrolysate, a second portion of the protein hydrolysate is collected as it exits from the bed. The second portion contains a bitter fraction of the protein hydrolysate.

10 Claims, No Drawings

DEBITTERED PROTEIN PRODUCT AND METHOD FOR MANUFACTURE

The present invention relates generally to the treatment of protein hydrolysate and more particularly relates to the recovery of a non-bitter fraction from hydrolyzed protein.

It is well known that when proteins are digested with strong acid or alkali or with enzymes, hydrolysis of the protein takes place with the subsequent formation of protein fragments, peptides and amino acids. Fragmented protein materials, produced by hydrolysis of proteins, are desirable products for administration to humans and animals with digestive problems, such as the incapability of breaking down whole protein in the digestive tract. A wide variety of hydrolyzed protein products are available. The degree of hydrolysis of the protein is generally determined by an analysis of the ratio of free amino nitrogen to total nitrogen. The present invention is directed to the treatment of hydrolyzed protein materials having an amino nitrogen to total nitrogen ratio in the range of from about 25 to about 80.

While hydrolyzed protein materials are desirable products they are often unpalatable to humans since they contain a bitter fraction. The separation of the bitter fraction of hydrolyzed protein from the non-bitter fraction has been a goal of the industry for many years. The present invention is directed to a method for separating the non-bitter fraction of hydrolyzed protein from the bitter fraction and to the non-bitter product resulting therefrom.

Accordingly, it is a principal object of the present invention to provide a method for treating hydrolyzed protein to separate a non-bitter fraction therefrom.

It is another object of the present invention to provide a non-bitter product from hydrolyzed protein.

These and other objects of the present invention will become more apparent from the following detailed description and the accompanying claims.

Generally, the present invention is directed to a method for debittering protein hydrolysates. In the method, an aqueous solution of a protein hydrolysate is provided. Thereafter, the solution is passed through a bed of phenolic resin particles. A first portion of the solution is collected as it exits from the bed. The first portion contains a non-bitter fraction of the protein hydrolysate. After collection of the first portion of non-bitter protein hydrolysate, a second portion of the protein hydrolysate is collected as it exits from the bed. The second portion contains a bitter fraction of the protein hydrolysate.

It is preferred that the pH of the solution be adjusted to a pH of about 8.5 or less, preferably from about 2.0 to about 8.5 and most preferably from about 5.0 to about 7.0 prior to passing the solution through the phenolic resin bed.

Phenolic resins useful in the present invention are obtained from the polymerization of phenol alcohols obtained by the condensation reaction between phenol and an aldehyde. In particular, phenolic resins useful in the present invention are provided from the polymerization of phenol alcohol obtained by reacting mixtures of phenol and formaldehyde having a phenol-aldehyde ratio (P/F ratio) which produces a granular condensation product. The phenolic resin produced preferably has a particle size of from about 16 to about 50 mesh, U.S. standard sieve size. The specific volume of the resin particles after being back washed, screened and drained is preferably from about 3 to about 4, most preferably about 3.5 ml/gm. A suitable phenolic resin is obtainable under the trade name DUOLITE S-761 from the Diamond Shamrock Chemical Company.

The resin particles are placed in a container to form a bed. While the diameter or cross section of the container can be of any size, the bed depth must be at least 30 inches. Deeper beds may be used to provide beds having a higher throughput. For the purpose of the present invention a depth of from about 30 inches to about 36 inches is preferred, although deeper beds may be utilized. The diameter or cross section of the resin bed determines the amount of protein hydrolysate that can be processed through the bed before regeneration is required. In general, from about 18 pounds to about 20 pounds of protein hydrolysate (dry basis) can be processed per cubic foot of resin bed volume before a regeneration cycle is required.

Protein hydrolysates produced from any edible source by any of the well known methods can be treated in accordance with the method of the present invention to separate bitter components from non-bitter components. Particularly suitable are protein hydrolysates produced from casein and from soy protein isolate. The protein hydrolysate may be produced by acid or base hydrolysis or by enzyme hydrolysis. The conditions for effecting hydrolysis of casein and soy protein isolate protein are well known in the art and hydrolyzed casein and soy protein isolate products are commercially available.

In the commercial manufacture of protein hydrolysates, it is customary practice to dry the protein hydrolysate product by spray drying or other suitable drying means. If a dried protein hydrolysate product is used, the dried protein hydrolysate is reconstituted in water to provide a solution having from about 10 to about 20 percent by weight protein hydrolysate solids. The pH of the solution is then adjusted to within the range of about 2.0 – 8.5 by the addition of a suitable acid or alkaline reagent, as required. A suitable acid reagent is hydrochloric acid and a suitable alkaline reagent is sodium hydroxide. The temperature of the solution is adjusted such that it falls within the range of activity of the resin employed prior to transferring the solution to the phenolic resin bed. For most suitable phenolic resins the temperature is adjusted to within the range of from about 5° C to about 80° C. A temperature of about 50° C is preferred.

The protein hydrolysate solution is introduced to the top of the phenolic resin bed at a rate not in excess of about four gallons per minute per cubic foot of bed. A rate of from about 0.5 to about 4 gallons per minute per cubic foot can be used. Preferably, the rate is about 0.5 to about 1.5 gallons per minute per cubic foot of resin bed.

The first fraction flowing from the bottom of the bed is collected in a first collection tank. This first fraction is a non-bitter protein hydrolysate fraction. It has been discovered that the bitterness of the protein hydrolysate exiting from the bed can be monitored by observance of the 280 nm absorbance by means of an UV spectrophotometer. The 280 nm absorbance of the solution collected from the bed gradually rises with time as more protein hydrolysate solution passes through the bed. Just prior to the 280 nm absorbance reaching a peak, the flow of material exiting from the bed is diverted to a second collection tank and feed of the protein hydrolysate solution to the top of the bed is stopped. The point at which the peak will occur can be determined by monitoring the conductivity of solids utilizing a conductivity meter. The solids peak just before the nm absorbance. The protein hydrolysate solution remaining in the bed is eluted from the bed by establishing pressure on the bed or by introduction of a stream of water at a temperature within the range of activity of the resin employed onto the top of the bed. In general, it has been discovered that the non-bitter fraction of the protein hydrolysate comprises from about 50 to about 75 percent by weight of the protein hydrolysate solids. The bitter fraction comprises from about 25 to about 50 percent by weight of the protein hydrolysate solids.

While not wishing to be bound by any theory, it is believed that the ability of the phenolic resin utilized in the present invention to separate a non-bitter fraction of protein hydrolysates from a bitter fraction of protein hydrolysates is dependent upon the ability of the phenolic resin to selectively absorb protein fractions and amino acids having aromatic ring constituents, such as phenylalanine, tyrosine and tryptophane. It is believed that such attraction for aromatic amino acids and peptides containing aromatic amino acids is due to a restraining effect by hydrophobic bond associations which occurs between the aromatic ring complexes present in the phenolic resin and the aromatic ring structures of phenylalanine, tyrosine and tryptophane amino acids and peptides containing phenylalanyl, tyrosyl and tryptophanyl amino acid residues.

During the hydrolysis of the protein, peptides and amino acids are produced. The phenolic resin has little effect on protein degradation products having a high molecular weight, i.e., about 10,000 and above. Accordingly, the hydrolysis should proceed to the point where the peptides have a relatively low molecular weight, i.e., below about 10,000. It has been determined that if the hydrolysis is permitted to proceed until the ratio of the free amino nitrogen to total nitrogen of the protein hydrolysate is in the range of from about 25 to about 80 the phenolic resin is useful to separate a non-bitter fraction of the protein hydrolysate from a bitter fraction and to provide a desirable non-bitter hydrolysate product.

The following example further illustrates various features of the invention but is not intended to in any way limit the scope of the invention which is defined in the appended claims.

EXAMPLE I

A protein hydrolysate was prepared from casein in accordance with the following procedure:

100 pounds of dried, acid precipitated casein were added to sufficient water to provide a dispersion having 10 percent by weight casein solids. The dispersion was agitated and heated to 110° F. Sufficient sodium hydroxide was added to the dispersion to raise the pH to 8. Sufficient cold water was added to the dispersion to reduce the casein solids to 8 percent by weight. The dispersion was agitated until the casein becomes hydrated and solubilized. The casein solution was then cooled to 43° C.

Hog pancreas glands were slurried with cold water and sufficient dispersed hog pancreas was added to the casein solution to provide 0.25 pounds of pancreas per pound of casein. The temperature of the casein solution was maintained at 49° C during the addition of the pancreas. Cold water was added to the solution in an amount sufficient to provide a solution having 6 percent casein solids by weight. The casein solution with added pancreas glands was then placed in a sealed container and held at a temperature of 43° C until the ratio of amino nitrogen to total nitrogen was about 48, which occurs in about 5 days.

The pH of the protein hydrolysate solution was adjusted to 7 with sodium hydroxide. Activated charcoal and diatomaceous earth filter aid were added to the protein hydrolysate. The protein hydrolysate solution was then heated to 79° C and was filtered in a plate and frame filter press. The filtrate was collected and was pasteurized by heating to 110° C for one minute. Thereafter, the filtrate was cooled to 65° C. The filtrate was then concentrated to 10 percent solids in a vacuum concentrator.

Seventy-five liters of the concentrated filtrate was then pumped to a 30.5 cm, inside diameter, column, 182.4 cm in length, containing 2 ft$^3$ of a phenolic resin obtained from Diamond Shamrock Chemical Company and having the trade name DUOLITE S-761. The phenolic resin bed had a depth of 36 inches. The protein hydrolysate solution was pumped to the top of the column at a flow rate of 3.78 liters/min. The output from the column was collected in a first tank (62 liters after void volume was eluted). At various intervals, samples were taken from the exit stream from the glass column and were subjected to conductivity and ultraviolet spectrophotometric measurement. The conductivity values were measured to establish a peak level. When the conductivity readings reached a peak just prior to the 280 nm absorbance peak, the flow exiting from the column was diverted to a second tank and the feed of the protein hydrolysate solution to the top of the column was stopped. Water was then fed into the top of the column at a rate of 3.78 liters/min. One-hundred liters of water were fed to the top of the column to elute the adsorbed protein hydrolysate from the column and into the second tank.

The first fraction collected contained 4875 grams of a non-bitter protein hydrolysate product which accounts for 65 percent of the total protein hydrolysate solids fed to the column. The second fraction (2625 grams) collected after diverting the flow exiting from the column to a second tank contains 35 percent by weight of the protein hydrolysate solids and constitutes a bitter fraction of the protein hydrolysate.

EXAMPLE II 3,972.5 grams of a pancreatic digest of soy protein isolate was dispersed in 75.0 liters of water pH 6.8 at 50° C with stirring.

The soy protein dispersion was then fed downflow through a 2 ft$^3$ resin bed the phenolic resin of Example I contained in a 30.5 cm × 182.9 cm pyrex glass column at a flow rate of 3.78 liters per minute. After 68.0 liters had emerged from the column the feed of the soy protein dispersion was stopped. An additional 106 liters of wash water was applied to the resin bed and a second fraction of soy protein hydrolysate was collected. The actual point of separation of these two major pooled fractions is determined by continuously monitoring conductivity (total solids) and the ultraviolet absorption 280 nm levels of the eluted soy protein hydrolysate. The conductivity value peaked after 60 liters of protein hydrolysate had emerged from the resin column. The ultraviolet absorption peak was attained after 70 liters had emerged.

Flavor evaluations of these fractions showed that the flavor changed from a pleasant beefy flavor to an intensely bitter, astringent flavor after the 280 nm absorbance peak was reached.

Both the nonbitter and bitter fractions were concentrated by vacuum distribution and spray dried. The nonbitter fraction contained 4994 grams and the bitter fraction contained 1816 grams.

Analytical compositions of the two fractions and the soy protein hydrolysate starting material are presented below in Table I.

TABLE I

| Sample | Total Nitrogen | Amino Nitrogen | AN/TN | Ash | H$_2$O |
|---|---|---|---|---|---|
| Soy Protein Hydrolysate | 13.34 | 6.25 | 46.8 | 7.58 | 3.83 |
| Non-bitter Fraction | 12.57 | 7.05 | 56.1 | 9.45 | 5.10 |
| Bitter Fraction | 12.90 | 5.93 | 46.0 | 6.97 | 4.25 |

An analysis of the aromatic amino acids, phenylalanine, tyrosine, and tryptophane, of starting soy protein hydrolysate, the nonbitter fraction and the bitter fraction was made and is presented below in Table II.

TABLE II

| | % by weight Amino Acid | | |
|---|---|---|---|
| Sample | Phe | Tyr | Trp |
| Soy Protein Hydrolysate | 4.72 | 1.49 | 0.99 |
| Non-bitter Fraction | 2.15 | 1.14 | 0.36 |
| Bitter Fraction | 8.81 | 1.83 | 1.36 |

EXAMPLE III

Five hundred grams of acid hydrolyzed casein identified by the trade name HyCase-SF70 were obtained from Humko-Sheffield Chemical Division of Kraftco Inc. The hydrolyzed casein was dissolved in 5.0 liters of water at 50° C, pH 6.5, conductivity 7000 μm and was passed down flow through a 0.12 ft$^3$ resin bed of the phenolic resin of EXAMPLE I at a flow rate of 400 ml/minute. A first hydrolysate fraction was collected (6.0 liters) after the void volume water had emerged. Collection of the first fraction was terminated at the conductivity peak value (6,950 μm). The ultraviolet absorption peak was attained in the next liter fraction and a second fraction was collected (6.0 liters) and pooled. The first fraction was found to have a non-bitter taste while the second fraction was bitter. Both the non-bitter and bitter fractions were dried. The yields of casein hydrolysate were 330.5 gm non-bitter fraction and 46.55 gm bitter fraction. The starting material, hydrolyzed casein, and the two fractions obtained from the resin bed were analyzed for aromatic amino acids and the results are presented below in TABLE III.

TABLE III

Reduction of Aromatic Amino Acids in Acid Casein Hydrolysate

| | % Amino Acid | | |
|---|---|---|---|
| | Phe | Tyr | Trp* |
| Acid hydrolyzed casein | 2.59 | 2.95 | — |
| Non-bitter fraction | 0.67 | 1.60 | — |
| Bitter fraction | 2.57 | 2.82 | — |

*Tryptophane is destroyed by acid hydrolysis.

What is claimed is:

1. A method for debittering protein hydrolysates comprising providing an aqueous solution of a protein hydrolysate, said hydrolysate having a molecular weight of less than about 10,000 and an amino nitrogen to total nitrogen ratio of from about 0.25 to about 0.80, feeding said solution to the top of a bed of phenol-aldehyde resin particles, collecting a first portion of said solution exiting from said bed which contains a non-bitter fraction of said hydrolysate and thereafter collecting a second portion of said solution exiting from said bed which contains a bitter fraction of said hydrolysate.

2. A method in accordance with claim 1 wherein said bed of resin particles is at least about 30 inches deep.

3. A method in accordance with claim 1 wherein said flow rate of said solution to said bed is less than about 4 gallons per minute per cubic foot of resin bed.

4. A method in accordance with claim 1 wherein the 280 nm absorbance of said solution exiting from said bed is monitored, said feeding of said solution to the top of said bed is terminated, and said solution exiting from said bed is diverted from a first collection tank to a second collection tank just prior to when said 280 nm absorbance reaches a peak.

5. A method in accordance with claim 1 wherein said second portion of said solution is eluted from said bed.

6. A method in accordance with claim 1 wherein said protein hydrolysate is derived from casein.

7. A method in accordance with claim 1 wherein said protein hydrolysate is derived from soy protein.

8. A debittered protein hydrolysate product produced in accordance with the process of claim 1.

9. A product in accordance with claim 8 wherein said protein hydrolysate is derived from casein.

10. A product in accordance with claim 8 wherein said protein hydrolysate is derived from soy protein.

* * * * *